United States Patent [19]

Nakamura et al.

[11] Patent Number: 5,319,028
[45] Date of Patent: Jun. 7, 1994

[54] POLYVINYL CHLORIDE PLASTISOL COMPOSITION

[75] Inventors: Eitaro Nakamura; Kazunori Ueki, both of Kawasaki, Japan

[73] Assignee: Nippon Zeon Co., Ltd., Tokyo, Japan

[21] Appl. No.: 806,222

[22] Filed: Dec. 13, 1991

[30] Foreign Application Priority Data

Dec. 17, 1990 [JP] Japan .................................. 2-411183

[51] Int. Cl.$^5$ ....................... C08L 27/06; C08L 33/10
[52] U.S. Cl. ................................... 525/227; 525/239; 525/302
[58] Field of Search ...................... 524/115, 155, 321; 525/227, 286, 293, 298, 302, 239

[56] References Cited

U.S. PATENT DOCUMENTS 4,155,954  5/1979  Büning et al. ....................... 525/302
4,670,490  6/1987  Yoshida ................................ 524/115

Primary Examiner—James J. Seidleck
Assistant Examiner—W. R. H. Clark
Attorney, Agent, or Firm—Sherman and Shalloway

[57] ABSTRACT

A polyvinyl chloride plastisol composition is provided, which contains as essential components (A) polyvinyl chloride resin particles prepared by microsuspension polymerization of vinyl chloride in the presence of a polymethyl methacrylate resin soluble in vinyl chloride and having polymethyl methacrylate resin localized on the surfaces of the resin particles, and (B) a plasticizer, and which has excellent thermal stability and stability with time of viscosity. The composition can be used advantageously as a material for use in processing procedures in which heat accumulates in plastisol being retained, for example, in slush processing, dip processing, etc. or for use in coating processing in which adhesiveness is required.

9 Claims, No Drawings

POLYVINYL CHLORIDE PLASTISOL COMPOSITION

The present invention relates to a novel polyvinyl chloride plastisol composition. More particularly, the present invention relates to a polyvinyl chloride plastisol composition which has excellent thermal stability and stability of viscosity with lapse of time and which is suitable for use in slush processing and dip processing as well as coating processing which is excellent in adhesion.

Heretofore, polyvinyl chloride resin (hereafter, sometimes referred to as "PVC") plastisols have been used widely in various fields such as steel plate coatings, construction material, cloths, daily necessaries, sundry goods, car parts, etc.

PVC plastisols are liquid suspensions comprising a polyvinyl chloride resin having specially adjusted particle diameter and particle size distribution and one or more optional powders such as a pigment, a filler, a viscosity modifier, a foaming agent, and a powder state stabilizer, uniformly dispersed in a liquid comprising a plasticizer as a major component and one or more optional additive such as a diluent and a liquid state stabilizer. The PVC plastisols are molten upon heating and solidified upon cooling to give a molded article. In other words, they are featured in that they can be molded similarly to thermosetting resins in spite of the fact that they are one of thermoplastic resins.

The behavior of PVC plastisols that they are molten upon heating and solidified upon cooling is based on the properties of PVC which do not absorb plasticizers almost at all at room temperature while at temperatures near or higher than their glass transient temperatures they absorb plasticizers at high rates.

When ambient temperature increases while they are being stored or transported, PVC plastisols gradually absorb plasticizers to increase their viscosities accordingly, and in some cases undesirable changes such as gelling and solidification will occur. In particular, such undesirable phenomena often occur in the case of PVC plastisols having decreased glass transition temperatures by copolymerizing vinyl chloride with vinyl acetate.

Therefore, in order to prevent the change of viscosity of PVC plastisols from occurring, it has been tried to coat particles of a polyvinyl chloride for plastisols with a polymethyl methacrylate, which is less compatible with a plasticizer such as dioctyl phthalate and having a high glass transition temperature, on the outer surfaces of PVC particles so that the penetration of the plasticizer into the resin particles during storage can be prevented.

For example, a polyvinyl chloride resin for plastisol use having a good stability with time of viscosity has been proposed, which was prepared by emulsion seed polymerization of a polymerizable monomer composed mainly of methyl methacrylate in the presence of a PVC for plastisols (cf. Japanese Patent Application Laid-Open No. 185518/1986).

However, generally this type of polyvinyl chloride for plastisol use is in the form of powder or particles whose outer shell portions are coated with a polymethyl methacrylate which is inflammable and having a low compatibility with plasticizers, and this causes various problems to arise. For example, there is a high possibility that dust explosion could occur due to hot air used in a drying step after polymerization. Upon preparing plastisols, the resin is poorly compatible with plasticizers, and as a result not only it takes a long time to prepare the resin but also plastisols prepared therewith have high yield values.

With view to obviating the aforementioned problems, the present inventors tried to prepare PVC particles for plastisol use which contain a polymethyl methacrylate polymer in the outer shell portions thereof in large amounts by adding methyl methacrylate in a final stage of polymerization of vinyl chloride for the preparation of the PVC for plastisols. However, this method is disadvantageous in that the viscosity of the plastisol obtained is not stable with time, and that the particles of the PVC obtained have a very low thermal stability.

Therefore, an object of the present invention is to provide a polyvinyl chloride plastisol composition which has excellent thermal stability and stability with time of viscosity as well as low viscosity, and which is suitable for slushing or dipping, or for coating with excellent adhesive properties.

In order to develop a polyvinyl chloride plastisol composition having the aforementioned desirable properties, the present inventors have made intensive studies, and as a result they have now found that the above-described object can be attained by the provision of a composition containing as essential components particles of a polyvinyl chloride resin having a polymethyl methacrylate resin localized on surfaces thereof and a plasticizer for the polyvinyl chloride resin.

Thus, according to the present invention, there is provided a polyvinyl plastisol composition comprising as essential components (A) polyvinyl chloride resin particles prepared by micro-suspension polymerization of vinyl chloride in the presence of a polymethyl methacrylate resin soluble in vinyl chloride and having polymethyl methacrylate resin localized on the surfaces the resin particles, and (B) a plasticizer, and which has excellent thermal stability and stability with time of viscosity.

Hereafter, the invention will be described in detail.

In the composition of the present invention, the particle of polyvinyl chloride resin (PVC particles) used as component (A) can be obtained by micro-suspension polymerization of vinyl chloride in the presence of polymethyl methacrylate resin which is soluble in vinyl chloride.

The polymethyl methacrylate resin may be a homopolymer of methyl methacrylate or a copolymer of methyl methacrylate with a monomer copolymerizable with methyl methacrylate and containing 60% by weight of methyl methacrylate unit.

Examples of the copolymerizable monomer include polymerizable unsaturated compounds having no reactive functional group, such as ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, cyclohexyl (meth)acrylate, 2-ethylhexyl (meth)acrylate, lauryl (meth)acrylate, stearyl (meth)acrylate, styrene, α-methylstyrene, p-vinyltoluene, acrylonitrile, ethylene, propylene, butene-1, and pentene-1; polymerizable unsaturated compounds having an epoxy group, such as glycidyl (meth)acrylate, 3,4-epoxycyclohexylmethyl (meth)acrylate, and cyclohexene monoxide; polymerizable unsaturated compounds having a carboxyl group, such as acrylic acid, methacrylic acid, ethacrylic acid, maleic acid, fumaric acid, itaconic acid, and acid anhydrides thereof; polymerizable unsaturated compounds having an amino group, such as 2-aminoethyl (meth)acrylate, 2-aminopropyl (meth)acrylate, 3-aminopropyl (meth)acrylate, 2-aminobutyl (meth)acrylate, 3-aminobutyl (meth)acrylate, 4-aminobutyl (meth)acrylate, (meth)acrylamide, N-2-aminoethyl (meth)acrylamide, N-2-aminpropyl (meth)acrylamide, and N-3-aminopropyl (meth)acrylamide; polymerizable unsaturated compounds having a hydroxyl group, such as 2-hydroxyethyl (meth)acrylate, 2-hydroxypropyl (meth)acrylate, 3-hydroxyethyl (meth)acrylate, 2-hydroxybutyl (meth)acrylate, 3-hydroxybutyl (meth)acrylate, 4-hydroxybutyl (meth)acrylate, and dipentaerythritol hexa(meth)acrylate; and the like. In case where it is desired that the plastisols obtained have excellent adhesive properties, the copolymerizable monomer may preferably be those monomers having a functional group such as an epoxy group, a carboxyl group, an amino group, or a hydroxyl group. The copolymerizable monomers may be used singly, or two or more monomers may be used in combination.

The polymethyl methacrylate resin may be used in any form such as pellet, powder or an aqueous dispersion. The polymethyl methacrylate resin must be soluble in vinyl chloride, and may preferably contain a tetrahydrofuran insoluble matter in an amount of 10% by weight or less. When it is intended to use the plastisol composition in slashing or dipping, the polymethyl methacrylate resin may preferably have a glass transition temperature of 70° C. or higher. The molecular weight of the polymethyl methacrylate resin is usually within the range of from 10,000 to 5,000,000.

On the other hand, vinyl chloride may be used singly, or in combination with a monomer copolymerizable therewith, if desired. As for the copolymerizable monomer, there can be cited, for example, include unsaturated monocarboxylic acid esters such as methyl (meth)acrylate, ethyl (meth)acrylate, propyl (meth)acrylate, butyl (meth)acrylate, octyl (meth)acrylate, cyclohexyl (meth)acrylate, and benzyl (meth)acrylate; unsaturated dicarboxylic acid diesters such as dimethyl maleate or fumarate, diethyl maleate or fumarate, dipropyl maleate or fumarate, dibutyl maleate or fumarate, dioctyl maleate or fumarate, dicyclohexyl maleate or fumarate, and dibenzyl maleate or fumarate; vinyl ethers such as methyl vinyl ether, ethyl vinyl ether, and propyl vinyl ether; olefins such as ethylene, propylene, butene-1, and pentene-1; aromatic monovinyl compounds such as styrene, and α-methylstyrene; cyanovinyl compounds such as acrylonitrile and methacrylonitrile; polymerizable unsaturated compounds having no reactive functional group, such as vinylidene chlrodie; unsaturated monocarboxylic or dicarboxylic acids and anhydrides thereof, such as acrylic acid, methacrylic acid, ethacrylic acid, maleic acid, cinnamic acid, maleic anhydride, fumaric acid, itaconic acid, and itaconic anhydride; unsaturated dicarboxylic acid monoalkyl esters such as monoalkyl maleate, monoalkyl fumarate, and monoalkyl itaconate; polymerizable unsaturated compounds having an epoxy group, such as glycidyl (meth)acrylate, 3,4-epoxycyclohexyl (meth)acrylate, and cyclohexene monoxide; polymerizable unsaturated compounds having an amino group, such as 2-aminoethyl (meth)acrylate, 2-aminopropyl (meth)acrylate, 3-aminopropyl (meth)acrylate, 2-aminobutyl (meth)acrylate, 3-aminobutyl (meth)acrylate, 4-aminobutyl (meth)acrylate, (meth)acrylamide, N-2-aminoethyl (meth)acrylamide, N-2-aminopropyl (meth)acrylamide, and N-3-aminopropyl (meth)acrylamide; polymerizable unsaturated compounds having a hydroxyl group, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and dipentaerythritol hexa(meth)acrylate; and the like.

The copolymerizable monomers may be used singly or two or more of them may be used in combination. They may be used preferably in amounts of 30% by weight or less based on the weight of vinyl chloride.

The PVC particles (A) used in the plastisol composition of the present invention can be obtained by micro-suspension polymerization of vinyl chloride and optionally one or more copolymerizable monomers in the presence of the aforementioned polymethyl methacrylate resin. It is desirable that the proportion of the polymethyl methacrylate resin and the resulting polyvinyl chloride polymer be 0.5:99.5 to 30:70 by weight.

If the amount of the polymethyl methacrylate resin is less than the above-described range, the particle diameter of the particles does not increase to a desirable extent so that plastisol composition having a low granularity cannot be obtained. On the other hand, if that amount exceeds the aforementioned range, the composition has a poor wettability with the plasticizer, with the result that the plastisol composition obtained tends to have a high viscosity.

In the micro-suspension polymerization according to the present invention, an oil-soluble radical initiator may be used as a catalyst. As the oil-soluble redical initiator, there can be used, for example, diacyl peroxides such as dibenzoyl peroxide, di-3,5,5-trimethylhexanoyl peroxide, and dilauroyl peroxide; peroxy dicarbonates such as diisopropyl peroxy dicarbonate, di-sec-butyl peroxy decarbonate, and di-2-ethylhexyl peroxy dicarbonate; peroxy esters such as t-butyl peroxy pivalates, and t-butyl peroxy neodecanoate; organic peroxides such as acetylcyclohexylsulfonyl peroxide, and disuccinic acid peroxide; azo compounds such as 2,2'-azobis-isobutyronitrile, 2,2'-azobis-2-methylbutyronitrile, and 2,2'-azobisdimethylvaleronitrile.

These catalysts may be used singly, or two or more of them may be used in combination. The amount of the catalyst may vary appropriately depending on the kind, amount and manner of charging of monomer. Usually, the amount of the catalyst may be selected within the range of 0.001 to 5.0 parts by weight per 100 parts by weight of the monomer used.

Usually, an emulsifier is used in the microsuspension polymerization method. Examples of the emulsifier include alkyl sulfate salts such as sodium lauryl sulfate and sodium myristyl sulfate; alkylaryl sulfonate salts such as sodium dodecylbenzenesulfonate, and potassium dodecylbenzenesullfonate; sulfosuccinate salts such as sodium dioctyl sulfosuccinate, sodium dihexyl sulfosuccinate; fatty acid salts such as ammonium laurate, and potassium stearate; anionic surfactants such as polyoxyethylene alkyl sulfate salts, and polyoxyethylene alkylaryl sulfate salts; sorbitan esters such as sorbitan monooleate, and polyoxyethylene sorbitan monostearate; monionic surfactants such as polyoxyethylene alkyl ethers, and polyoxyethylene alkylphenyl ethers; cationic surfactants such as cetylpyridinium chloride, and cetyltrimethylammonium bromide; as well as styrene/maleic acid copolymer ammonium slat; and the like.

These emulsifiers may be used singly, or two or more of them may be used in combination. The amount of the emulsifier may be usually 0.05 to 5 parts by weight, preferably 0.2 to 4.0 parts by weight, per 100 parts by weight of the monomer used.

In the micro-suspension polymerization method, first the oil-soluble catalyst, total amount or 50% by weight or more of the monomer to be used, the polymethyl methacrylate type resin and the emulsifier, and optionally polymerization aids such as higher fatty acids, higher alcohols, and other additives are added in an aqueous medium, and the resulting mixture is homogenized with a homogenizer for premixing in order to adjust the particle diameter of oil drops.

As the homogenizer which can be used in the homogenization treatment, there can be cited, for example, a colloid mil, a vibration stirrer, a two-step high pressure pump, high pressure atomization from a nozzle or orifice, supersonic stirring, etc. The adjustment of particle diameter of oil drops is influenced by control of shearing force during the homogenization treatment, mixing conditions during the polymerization, type of reaction vessel used, amounts of emulsifier and/or additive, and the like. Suitable conditions can easily be selected by simple preliminary experiments.

Next, the homogenized liquid is sent to a polymerization vessel, in which it is stirred slowly with elevation of its temperature. Usually, polymerization is performed at a temperature within the range of 30° to 80° C. In the case where some portion of the monomer have retained unused in the premixing, polymerization is performed with dropwise adding the remainder of the monomer continuously or intermittently.

In this manner, there can be obtained a latex containing homogeniously dispersed therein PVC particles, which particles have polymethyl methacrylate resin localized on the surfaces thereof and have a mean particle diameter on the order of 0.2 to 3 μm.

The content of the ionic emulsifier in the PVC particles is desirably 0.5% by weight or less in order to obtain transparent molded articles or adhesive sols. In order to obtain sols for foaming, a suitable amount not exceeding 2% by weight is selected. It may be suitable that the degree of polymerization of the polyvinyl chloride polymer in the resin particles be 700 to 3,000.

The latex can be used as it is for some purposes while it can be converted into powder by known treatments such as salting out or spray-drying.

The PVC plastisol composition of the present invention must contain as essential components (A) PVC particles, and (B) a plasticizer for the PVC.

There is no limitation on the plasticizer (B) for the PVC, and various common plasticizers for PVC plastisols may be used. Examples of such conventional plasticizers include phthalic acid derivatives such as dimethyl phthalate, diethyl phthalate, dibutyl phthalate, di-(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, di(heptyl, nonyl, undecyl) phthalate, benzyl phthalate, butylbenzyl phthalate, dinonyl phthalate, and dicyclohexyl phthalate; isophthalic acid derivatives such as dimethyl isophthalate, di-(2-ethylhexyl) isophthalate, and diisooctyl disophthalate; tetrahydrophthalic acid derivatives such as di-(2-ethylhexyl) tetrahydrophthalate, di-n-octyl tetrahydrophthalate, and diisodecyl tetrahydrophthalate; adipic acid derivatives such as di-n-butyl adipate, di-(2-ethylhexyl) adipate, diisodecyl adipate, and diisononyl adipate; azelaic acid derivatives such as di-(2-ethylhexyl) azelate, diisooctyl azelate, and di-n-hexyl azelate; sebacic acid derivatives such as di-n-butyl sebacate, and di-(2-ethylhexyl) sebacate; maleic acid derivatives such as di-n-butyl maleate, dimethyl maleate, diethyl maleate, and di-(2-ethylhexyl) maleate; fumaric acid derivatives such as di-n-butyl fumarate, and di-(2-ethylhexyl) fumarate; trimellitic acid derivatives such as tri(2-ethyl-hexyl) trimellitate, tri-n-octyl trimellitate, triisodecyl trimellitate, triisooctyl trimellitate, tri-n-hexyl trimellitate, and triisononyl trimellitate; pyromellitic acid derivatives such as tetra-(2-ethylhexyl) pyromellitate, and tetrah-n-octyl pyromellitate; citric acid derivatives such as triethyl citrate, tri-n-butyl citrate, acetyl triethyl citrate, and acetyl tri-(2-ethylhexyl) citrate; itaconic acid derivatives such as monomethyl itacontate, monobutyl itacontate, dimethyl itaconate, diethyl itaconate, dibutyl itaconate, and di(2-ethylhexyl) itaconate; oleic acid derivatives such as butyl oleate, glyceryl monooleate, diethylene glycol monooleate; ricinolic acid derivatives such as methyl acetyl icinolate, butyl acetyl ricinolate, glyceryl monoricinolate, and diethylene glycol ricinolate; stearic acid derivatives such as n-butyl stearate, glycerin monostearate, and diethylene glycol distearate; other fatty acid derivatives such as diethylene glycol monolaurate, diethylene glycol dipelargonate, pentaerythritol fatty acid ester; phosphoric acid derivatives such as triethyl phosphate, tributyl phosphate, tri-(2-ethylhexyl) phosphate, tributoxyethyl phosphate, triphenyl phosphate, cresyl dipenyl phosphate, tricresyl phosphate, trixylenyl phosphate, and tris(chloroethyl) phosphate; glycol derivatives such as diethylene glycol dibenzoate, dipropylene glycol dibenzoate, triethylene glycol di-(2-ethylbutyrate), triethylene glycol di-(2-ethylhexoate), dibutylmethylenebisthio-glycolate; glycerin derivatives such as glycerol monoaceate, glycerol triacetate, and glycerol tributyrate; epoxy derivatives such as epoxylated soy bean oil, epoxybutyl stearate, 2-ethylhexyl epoxyhexahydrophthalate, diisodecyl epoxyhexahydrophthalate, epoxytriglyceride, epoxylated octyl oleate, and epxoylated decyl oleate; polyester type plasticizers such as adipate type polyester, sebacate type polyester, and phthalate type polyester; partially hydrogenated terphenyl; adhesive plasticizers; and the like.

These plasticizers may be used singly, or two or more of them may be used in combination. The amount of the plasticizer may be selected usually within the range of 40 to 250 parts per 100 parts by weight of the PVC particles.

The composition of the present invention may be blended with other additive components commonly used in the conventional PVC plastisols, for example, inorganic fillers, thermal stabilizes, viscosity controlling agents, foaming agents, diluents, crosslinking agents, etc. so far as the object of the invention is not damaged.

As the inorganic filler, there can be cited for example, calcium carbide such as precipitated calcium carbide, or ultrafine calcium carbide; magnesium carbide; silicates such as silica, talc, diatomaceous earth, clay, and mica; and alumina.

Examples of the thermal stabilizer include metal soaps such as magnesium stearate, aluminum stearate, calcium stearate, barium stearate, zinc stearate, calcium laurate, barium laurate, and zinc alurte; organotin compounds such as dibutyltin dilaurate, dibutyltin dimaleate, and monobutyltin mercaptide; phosphorous acid esters such as diethyl phosphite, dibutyl phosphite, dioctyl phosphite, diphenyl isodecyl phosphite, tricresyl phosphite, triphenyl phosphite, tris(nonylphenyl) phosphite, and triisooctyl phosphite; and the like.

As the viscosity modifier, there can be cited, for example, solvents such as xylene, solvent naphtha, mineral spirit, methyl isobutyl ketone, and butyl acetate, and suitable surfactants. As the foaming agent, there can be cite, for example, inorganic foaming agents such as sodium borate, and sodium hydrogen carbonate, and organic foaming agents such as azodicarboxamide, P,P'-oxybis(benzenesulfonylhydrazide), and N,N'-dinitroso-N,N'-dimethyleterephthalamide.

As the crosslinking agent which can be used, acidic phosphates, triazines, polyamines, polyamides and the like are preferred when the PVC particles (A) have an epoxy group as a functional group; polycaboxylates, polyepoxides and the like are preferred when the PVC particles (A) have an amino group as a functional group. On the other hand, polyisocyanate compounds are preferred when the PVC particles (A) have a hydroxyl group as a functional group; and polyamides, polyamines, polyepoxides and the like are preferred when the PVC particles (A) have a carboxyl group as a functional group.

In the PVC plastisol composition thus obtained according to the present invention, the polymethyl methacrylate resin is localized on the surfaces of the PVC particles, and hence the plastisol composition is compatible with the plasticizer used, thus giving a good thermal stability and a good stability with time of viscosity as well as a very low viscosity. These characteristics can be exhibited sufficiently when the content of the polymethyl methacrylate type resin in the PVC particles is small, e.g., as small as 10% by weight or less.

Since it has a small change in viscosity with time even at high storage temperatures, the plastisol composition of the present invention can be used advantageously in those processing or manufacturing methods in which heat accumulates in the plastisol during retention, such as slushing process and dipping process.

As already described above, when the plastisol composition of the invention is used for slushing or dipping, it is suitable that the polymethyl methacrylate resin in the PVC particles (A) has a glass transition temperature of 70° C. or higher and a gelling initiation temperature of 70° C. higher. Use of such a plastisol composition makes it possible to give molded articles having uniform thicknesses constantly.

On the other hand, the plastisol composition of which the polymethyl methacrylate in the PVC particles (A) has at least one reactive functional group selected from the group consisting of an epoxy group, a carboxyl group, an amino group and a hydroxyl group, when used in coating processing not only exhibits excellent adhesion with substrates but also enable its modification or crosslinking utilizing reactions of the functional group or groups, resulting in increased the resistant hardness or strength of the molded article to be obtained.

Next, the present invention will be described in more detail by examples. However, the invention should not be construed as being limited thereto.

The characteristics of the powder of PVC for plastisols obtained in Preparation Examples and Comparative Examples were obtained as follows.

(1) Content of Polymethyl Methacrylate Resin

The powder of the PVC for plastisols was extracted with a methanol/water mixture (50/50 by weight), and proportion of the polymethyl methacrylate type resin contained in the residue was calculated.

(2) Content of Ionic Emulsifier

This was obtained by analysis of the extract in (1) above.

(3) Ratio of Concentration of Polymethyl Methacrylate Resin on Surface

The powder of the PVC for plastisols was molded into tablets using a tableting machine. On the other hand, the powder was dissolved in tetrahydrofuran to form a film. The surface area (a) of a sample tablet and cross sectional area (b) of the film were analyzed by ESCA to obtain O/Cl ratios, respectively. Base on them concentration ratio of the polymethyl methacrylate resin was calculated by the following formula:

$$\text{Concentration ratio} = (O/Cl)_a / (O/Cl)_b$$

(4) Dust Explosibility

Using a Hartman dust explosion tester, dust explosion tests were conducted under the conditions of sample/air ratio of 200 mg/liter. Tests were repeated ten times for each sample. Those samples which showed increase in pressure at least one test were judged to "have a dust explosibility".

PREPARATION EXAMPLE 1

Hundred grams (100 g) of polymethyl methacrylate ($T_g = 104°$ C.) having a weight average molecular weight of 200,000 were charged in a 5-liter pressure-resistant glass vessel with a stirrer. After deaeration, 200 g of vinyl chloride were charged therein, and the mixture was stirred for 2 hours to obtain a solution of polymethyl methacrylate in vinyl chloride.

On the other hand, 3,600 g of deionized water, 8 g of dioctyl sulfosuccinate, 4.2 g of dioctyl peroxydicarbonate, and 0.8 g of 3,5,5-trimethyl-hexanoyl peroxide were charged in a 10-liter stainless steel autoclave. After deaeration, total amount of the vinyl chloride solution of polymethyl methacrylate in the aforementioned pressure-resistant glass vessel was introduced in the autoclave, and the contents were stirred for 30 minutes and then passed through a homogenizer. Then, the resulting mixture was transported to a 10-liter stainless steel autoclave for polymerization, which was equipped with a stirrer and filled with vinyl chloride vapor.

After elevating the internal temperature of the autoclave for polymerization to 47° C., polymerization was initiated. When the degree of polymerization conversion of vinyl chloride reached 50%, 800 g of vinyl chloride were poured into the polymerization reaction vessel at a rate of 200 g/hour. When the internal pressure of the autoclave decreased to 3 kg/cm$^2$, unreacted vinyl chloride monomers were collected to obtain a polymer dispersion. The polymer dispersion was dried in a spray dryer having a rotary disc type atomizer, and thus powder (A) of PVC for plastisols was obtained.

The resin powder for plastisols (A) had a mean particle diameter of 4.2 μm, a polymethyl methacrylate content of 4% by weight, a polyvinyl chloride content of 96% by weight, an ionic emulsifier content of 0.35% by weight, and a concentration ratio of polymethyl methacrylate on surface of 12.

Further, the powder (A) had good efficiencies since the amount of adhering scales and agglomerated polymer particles during polymerization were 0.1% by weight or less based on the charge, respectively, and no dust explosibility was observed.

PREPARATION EXAMPLE 2

In a stainless steel autoclave were charged 1,200 g of an aqueous dispersion of an emulsion polymerization product of methyl methacrylate and glycidyl methacyrlate having a resin concentration of 33.3% by weight (average molecular weight of resin=51,000, Tg=90° C., copolymerization ratio of glycidyl methacrylate=10% by weight, tetrahydrofuran insoluble matter=none), together with 2,800 g of deionized water and 5.0 g of dioctyl peroxydicarbonate. After deareation, 2,600 g of vinyl chloride were added and the resulting mixture was stirred. The contents were passed through a homogenizer and then transported to an autoclave for polymerization filled with vinyl chloride vapor and reacted therein at 47° C.

After the polymerization, unreacted vinyl chloride monomers were collected, and thereafter the same procedures as in Preparation Example 1 were repeated to obtained resin powder for plastisols (B).

The resin powder for plastisols (B) had a mean particle diameter of 3.0 μm, a polymethyl methacrylate content of 15% by weight, a polyvinyl chloride content of 85% by weight, an ionic emulsifier content of 0.30% by weight, and a concentration ratio of polymethyl methacrylate on surface of 4. The powder (B) had similar operational efficiencies to those of the powder (A) obtained in Preparation Example 1.

PREPARATION EXAMPLE 3

The resin powder for plastisols (C) was prepared by repeating the procedures in Preparation Example 1 except that the vinyl chloride solution of polymethyl methacrylate was replaced by a solution of 200 g of polymethyl methacrylate having a molecular weight of 40,000 (Tg=100° C.) in a mixture of 1,700 g of vinyl chloride and 300 g of vinyl acetate.

The resin powder for plastisols (C) had a mean particle diameter of 3.2 μm, a polymethyl methacrylate content of 8% by weight, a vinyl acetate unit content of 10% by weight, a polyvinyl chloride unit content of 82% by weight, an ionic emulsifier content of 0.35% by weight, and a concentration ratio of polymethyl methacrylate on surface of 4. The powder (C) had similar operational efficiencies to those of the powder (A) obtained in Preparation Example 1.

PREPARATION EXAMPLE 4

The resin powder for plastisols (D) was prepared by repeating the procedures in Preparation Example 1 except that 80 g of glycidyl methacrylate was added to vinyl chloride poured during polymerization.

The resin powder for plastisols (D) had a mean particle diameter of 4.0 μm, a polymethyl methacrylate content of 7% by weight, a polyvinyl chloride content of 93% by weight, an ionic emulsifier content of 0.33% by weight, and a concentration ratio of polymethyl methacrylate on surface of 8. The powder (C) had similar operational efficiencies to those of the powder (A) obtained in Preparation Example 1.

COMPARATIVE PREPARATION EXAMPLE 1

The resin powder for plastisols (E) was prepared by repeating the procedures in Preparation Example 1 except that no polymethyl methacrylate was used.

The resin powder for plastisols (E) was a homopolymer of vinyl chloride having a mean particle diameter of 1.0 μm, an ionic emulsifier content of 0.36% by weight, and a concentration ratio of polymethyl methacrylate on surface of 4. The operation efficiencies of the powder (E) were not good since the amounts of adhering scale and agglomerated polymer particles during polymerization were 0.7% by weight or less based on the charge, respectively, although no dust explosibility was observed.

COMPARATIVE PREPARATION EXAMPLE 2

The resin powder for plastisols (F) was prepared by repeating the procedures in Preparation Example 3 except that no polymethyl methacrylate was used.

The resin powder for plastisols (F) had a mean particle diameter of 1.1 μm, a vinyl acetate unit content of 11% by weight, a vinyl chloride unit content of 89% by weight, and an ionic emulsifier content of 0.35% by weight. The operational efficiencies of the powder (F) were not good since the amount of adhering scale and agglomerated polymer particles during polymerization was 0.9% by weight or less based on the charged polymer material although no dust explosibility was observed.

COMPARATIVE PREPARATION EXAMPLE 3

The resin powder for plastisols (G) was prepared by repeating the procedures in Preparation Example 1 except that polymerization was initiated using no polymethyl methacrylate, followed by pouring 100 g of methyl methacrylate after the pouring of 800 g of vinyl chloride to be added during the polymerization.

The resin powder for plastisols (G) had a mean particle diameter of 0.9 μm, a methyl methacrylate unit content of 4% by weight, a vinyl chloride unit content of 96% by weight, an ionic emulsifier content of 0.36% by weight, and a concentration ratio of a methyl methacrylate unit on surface of 10% by weight. The operational efficiencies of the powder (G) were not good since the amount of adhering scale and agglomerated polymer particles during polymerization was 1.0% by weight or less based on the charged polymer material although no dust explosibility was observed.

COMPARATIVE PREPARATION EXAMPLE 4

In an autoclave were charged an aqueous dispersion of a vinyl chloride/vinyl acetate copolymer obtained by micro-suspesnion polymerization and having a particle size of 1.56 μm, and a vinyl acetate unit content of 12% by weight, and 0.05 part by weight of potassium persulfate per 100 parts by weight of the resin in the aqueous dispersion. After deaeration, the mixture was heated to 60° C.

Then, 10% by weight aqueous solution containing 0.05 part of sodium dodecylbenzenesulfonate along with 18 parts by weight of methyl methacrylate were poured continuously in the mixture in 4 hours. Polymerization was allowed to proceed up to a degree of conversion of 95%, when the reaction was stopped. The aqueous dispersion thus obtained was spary-dried to obtain resin powder for plastisols (H).

The resin powder for plastisols (H) had a mean particle diameter of 1.6 μm, a polymethyl methacrylate content of 15% by weight, a vinyl acetate unit content of 10% by weight, a vinyl chloride unit content of 75% by weight, an ionic emulsifier content of 1.20% by weight, and a concentration ratio of polymethyl methacrylte of surface of 4% by weight. The operational efficiencies of the powder (H) were not good since dust explosibility was observed although the amount of adhering scale and agglomerated polymer particles during polymerization was 1.0% by weight or less based on the charged polymer material.

As will be understood from the Preparation Examples 1 to 4 and Comparative Preparation Examples 1 to 4, the powders A to D which can be used for plastisol composition of the invention are stable upon polymerization and cause less adhering of scales and generate less agglomeration of particles even when the amount of the emulsifier used was small, thus improving operational efficiencies of polymerization as well as enable drying with hot air since they have no dust explosibility upon drying.

PLASTISOL FOR USE IN SLUSH MOLDING

Example 1 and Comparative Examples 1 and 2

In a Dalton universal mixer were mixed 500 g of one of resin powder A (Example 1), resin powder E (Comparative Example 1), and resin powder G (Comparative Example 2), and 250 g of diethylhexyl phthalate, 15 g of Ba-Zn type fluidity stabilizer, and 100 g of pale blue toner, and the mixture was defoamed to prepare plastisols.

Parts of the plastisols were measured for changes in $G'$ and $G''$ according to the method of Nakajima et al. (cf. J. of Appl. Poly. Sci., 28, p.807-822 (1983)) using Ireometrix Mechanical Reometer, and temperatures which gave minimal values of $G'$ were determined as gelling initiation points.

Further, preheating temperature, retention time, sol supply cutting time and melting time were set up so that a molded article having a uniform thickness of 0.8 mm was able to be obtained from 700 g of plastisol, and molding was repeated 200 times under the conditions.

The viscosities of sols before the molding started were measured using BM type rotary viscometer No. 4 rotor at 30 rpm. The thicknesses of vertically split portions of the molded articles were measured for ten molded articles, i.e., the first to tenth molded articles, and average value of differences from the set-up value was calculated and defined as nonuniformity of thickness.

On the other hand, the average weight (c) of 10 molded articles, i.e., the first to tenth molded articles, and the average weight (d) of 10 molded articles, i.e., the 191st to 200th molded articles, were measured, and variation of weight was expressed in terms of (d)/(c). Further, the molded articles were cut to obtain sheet-like pieces, which were left to stand in an oven at 180° C. for 30 minutes. Degree of change of color for each piece after this treatment was visually observed as a measure for thermal stability of the molded article. Results obtained are shown in Table 1 below.

TABLE 1

|  | Example 1 | Comparative Example 1 | Comparative Example 2 |
|---|---|---|---|
| Kind of Resin Powder Plastisol | A | E | G |
| Gelling Initiation Temperature (° C.) | 72 | 65 | 65 |
| Viscosity (cps) Molded Article | 2,100 | 6,200 | 7,100 |
| Nonuniformity of thickness (mm) | 0.09 | 0.21 | 0.31 |
| Thermal stability | No color change | No color change | Brown |
| Weight increase ratio | 1.10 | 1.78 | 2.40 |

The results described above revealed that the plastisol composition of the invention had a high ceiling initiation temperature as high as at least 70° C., and a low viscosity, and that the molded articles obtained from the plastisol composition had good uniformity in thickness and good thermal stability, and causes less change of sol during operation. Therefore, the plastisol composition of the invention can give molded articles having a stabilized quality upon slush molding.

ADHESIVE PLASTISOL

Examples 2 and 3, and Comparative Example 3

In an attritor were mixed 100 g of one of resin powder (B) (Example 2), resin powder D (Example 3) and Nipeon 121 (Polyvinyl chloride resin for plastisols manufacutred by Nippon Zeon Co., Ltd.) (Comparative Example 3), and 35 parts by weight of di-2-ethylhexyl phthalate, 20 parts by weight of dioctyl adipate, 1 part by weight of dibutyltin mercaptide, 0.3 part by weight of 2,2'-methylenebis-4-methyl-6-t-butylphenol, and 0.2 part by weight of 2-(2'-hydroxy-5'-methylphenyl)benzotriazole, and the mixture was defoamed to prepare plastisols.

Each of the thus-obtained plastisols was coated on a glass plate in a width of 50 mm, a length of 150 mm and a thickness of 0.8 mm using a doctor blade, and heated at 180° C. for 30 minutes to form a sheet, which then was cut in a longitudinal direction at a pitch of 10 mm to obtain five pieces of sheet of 10 mm wide, 150 mm long and 0.8 mm thick. Middle three pieces were each subjected to 180° C. peeling test using a Universal tensile tester to obtain three values. Then a mean value was calculated from the three values to obtained bond strength.

Also, the plastisol composition was coated on a glass plate in a thickness of 0.8 mm, and another glass plate was superimposed on the first glass plate via the coated layer of sol. In this state, the resulting structure was heated at 180° C. for 30 minutes to obtained a lamianted glass. The haze of the laminated glass was measured using a direct-reading haze-o-meter. Results obtained are shown in Table 2 below.

TABLE 2

|  | Example 2 | Example 3 | Example 3 |
|---|---|---|---|
| Kind of Resin Powder | B | D | Nipeon 121 |
| Bond strength (kg/cm) | 5 | 4 | <0.1 |
| Haze (%) | 0.9 | 0.7 | 4.5 |

The results shown in Table 2 above indicate that the plastisol composition of the present invention has excellent bond strength and is transparent.

LOW TEMPERATURE-MELTING PLASTISOL

Example 4

A mixture of 50 parts by weight of resin powder C, 50 parts by weight of polyvinyl chloride resin for blending (Nipeon 103ZXA, trade name for a product by Nippon Zeon Co., Ltd.), 60 parts by weight of dioctyl phthalate, and 3 parts by weight of a stabilizer (AC173, trade name for a product by Adeca Argus Chemical Co., Ltd.) was mixed in an Ishikawa-type attritor, and subjected to defoaming treatment under reduced pressure to prepare a plastisol.

The viscosity of the plastisol was measured under the condition of 6 rpm of No. 4 rotor using a Bookfield viscometer (BX type viscometer, manufactured by Tokyo Keiki Co., Ltd.)

The plastisol was cast on a 3 mm-thick aluminum plate in a thickness of 0.5±0.05 mm, and heat-molded for 5 minutes at a predetermined temperature to foam a sheet. Then, JIS No. 3 dumbbell test piece was cut out of the sheet, and measured for its breaking strength using a tensil tester (TOM500 type, manufactured by Shinko Tsushin Kogyo Co., Ltd.).

Example 5

The procedures of Example 4 were repeated except that the polyvinyl chloride resin for blending Nipeon 103ZXA was repalced by 100 parts by weight of resin powder C.

Comparative Examples 4 and 5

The procedures of Example 4 were repeated except that the resin powder C was replaced by resin powder F (Comparative Example 4) or resin powder H (Comparative Example 5).

Comparative Example 6

The precedures of Example 4 were repeated except that the resin powder C and the polyvinyl chloride resin for blending were replaced by 100 parts by weight of Nipeon 121.

Results obtained in Examples 4 and 5, and Comparative Examples 4 to 6 are shown in Table 3 below.

TABLE 3

|  | Example 4 | Example 5 | Comparative Example 4 | Comparative Example 5 | Comparative Example 6 |
|---|---|---|---|---|---|
| Kind of Resin Powder | C/103ZXA | C | F/103ZXA | H/103ZXA | Nipeon 121 |
| Viscosity (cps) |  |  |  |  |  |
| 1 Hour after preparation | 1,600 | 2,400 | 10,500 | 10,600 | 6,100 |
| 7 Days after preparation | 1,800 | 2,900 | solidification | 8,400 | 8,000 |
| Sheet Breaking Strength (kg/cm$^2$) |  |  |  |  |  |
| 120° C. | 58 | 62 | 40 | 54 | 19 |
| 140° C. | 110 | 120 | 90 | 101 | 70 |
| 160° C. | 141 | 144 | 144 | 138 | 120 |
| 180° C. | 142 | 148 | 140 | 141 | 145 |

The results shown in Table 3 above indicate that the plastisol composition of the present invention has not only a low viscosity but also an excellent stability with time of viscosity, and sheet obtained from the plastisol composition has a breaking strength equal to that of sheet obtained from the conventional plastisol.

What is claimed is:

1. A polyvinyl chloride plastisol composition comprising, as essential components:

(A) polyvinyl chloride resin particles having a polymethyl methacrylate resin soluble in vinyl chloride localized on surfaces of said resin particles, said polymethyl methacrylate resin having a weight average molecular weight within the range of from 10,000 to 5,000,000, said polymethyl methacrylate resin being present in said polyvinyl chloride resin particles in an amount of 0.5 to 30% by weight based on the weight of the polyvinyl chloride resin particles; and (B) a plasticizer.

2. The polyvinyl chloride resin plastisol composition as claimed in claim 1, wherein said polymethyl methacrylate resin has a glass transition temperature of 70° C. or higher and a gelling initiation temperature of 70° C. or higher.

3. The polyvinyl chloride resin plastisol composition as claimed in claim 1, wherein said polymethyl methacrylate resin is selected from the group consisting of homopolymers of methyl methacrylate and copolymers of methyl methacrylate with a copolymerizable monomer, said copolymers containing at least 60% by weight of methyl methacrylate.

4. The polyvinyl chloride resin plastisol composition as claimed in any one of claims 1, 2 and 3, wherein said polyvinyl chloride resin particles (A) contain an ionic emulsifier in an amount of 0.5% by weight or less.

5. The polyvinyl chloride resin plastisol composition as claimed in any one of claims 1, 2, and 3, wherein said polyvinyl chloride resin particles (A) contain said polymethyl methacrylate resin in an amount of less than 10% by weight.

6. The polyvinyl chloride resin plastisol composition as claimed in claim 3, wherein said copolymerizable monomer is a polymerizable unsaturated compound having an epoxy group, a polymerizable unsaturated compound having a carboxyl group, a polymerizable unsaturated compound having an amino group or a polymerizable unsaturated compound having a hydroxyl group.

7. The polyvinyl chloride resin plastisol composition as claimed in claim 1, wherein said polyvinyl chloride resin contains 30% by weight or less of at least one copolymerizable monomer.

8. The polyvinyl chloride resin plastisol composition as claimed in claim 7, wherein said copolymerizable monomer is selected from the group consisting of unsaturated monocarboxylic acid esters, unsaturated dicarboxylic acid diesters, vinyl ethers, olefins, monovinyl aromatic compounds and cyanovinyl compounds.

9. The polyvinyl chloride resin plastisol composition as claimed in claim 7, wherein said copolymerizable monomer is selected from the group consisting of unsaturated monocarboxylic or dicarboxylic acids or anhydrides thereof; unsaturated dicarboxylic acid monoalkyl esters; polymerizable unsaturated compounds having an epoxy group; polymerizable unsaturated compounds having an amino group; and polymerizable unsaturated compounds having a hydroxyl group.

* * * * *